US010305883B2

(12) United States Patent
Kang et al.

(10) Patent No.: US 10,305,883 B2
(45) Date of Patent: May 28, 2019

(54) ELECTRONIC DEVICE AND METHOD FOR COMMONLY USING THE SAME

(71) Applicant: Samsung Electronics Co., Ltd., Suwon-si, Gyeonggi-do (KR)

(72) Inventors: In Ku Kang, Gunpo-si (KR); Young Sik Kim, Suwon-si (KR); Yu Seung Kim, Seoul (KR); Tae Hyun Kim, Seoul (KR); Dushyant Vipradas, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 15/226,228

(22) Filed: Aug. 2, 2016

(65) Prior Publication Data

US 2017/0048236 A1 Feb. 16, 2017

(30) Foreign Application Priority Data

Aug. 12, 2015 (KR) ........................ 10-2015-0114117

(51) Int. Cl.
| | |
|---|---|
| *G06F 21/00* | (2013.01) |
| *H04L 29/06* | (2006.01) |
| *H04L 29/08* | (2006.01) |
| *G06F 21/31* | (2013.01) |
| *G06F 8/61* | (2018.01) |

(52) U.S. Cl.
CPC ............ *H04L 63/0815* (2013.01); *G06F 8/61* (2013.01); *G06F 21/31* (2013.01); *H04L 63/083* (2013.01); *H04L 67/1095* (2013.01)

(58) Field of Classification Search
None
See application file for complete search history.

(56) References Cited

U.S. PATENT DOCUMENTS

| | | |
|---|---|---|
| 6,996,407 B2 | 2/2006 | Taniguchi |
| 7,574,440 B2 | 8/2009 | Kichikawa et al. |
| 8,464,338 B2 | 6/2013 | Okubo |
| 8,612,582 B2 | 12/2013 | Dare et al. |
| 8,943,607 B2 | 1/2015 | Okubo |

(Continued)

FOREIGN PATENT DOCUMENTS

| | | |
|---|---|---|
| JP | 2015001765 A | 1/2015 |
| KR | 10-2005-0013764 A | 2/2005 |

(Continued)

*Primary Examiner* — Alexander Lagor
(74) *Attorney, Agent, or Firm* — Jefferson IP Law, LLP

(57) ABSTRACT

An electronic device and a method for commonly using the electronic device are provided. The electronic device includes a housing, a memory disposed in the housing, a communication circuit in communication with at least one external device, and a processor electrically connected to the memory and the communication circuit. The processor is configured to control for installing at least one application on the memory in response to a login request from a user, receiving a logout request from the user after the at least one application is installed, transmitting data associated with the at least one application to the at least one external device using the communication circuit in response to the logout request, and deleting at least a portion of the at least one application and the data associated with the at least one application from the memory.

15 Claims, 15 Drawing Sheets

(56) References Cited

U.S. PATENT DOCUMENTS

| | | |
|---|---|---|
| 8,989,704 B2 | 3/2015 | Jayasuriya et al. |
| 9,400,893 B2 | 7/2016 | Tseng et al. |
| 2002/0045457 A1 | 4/2002 | Taniguchi |
| 2006/0031529 A1 | 2/2006 | Keith, Jr. |
| 2007/0143288 A1 | 6/2007 | Kichikawa et al. |
| 2009/0204804 A1 | 8/2009 | Okubo |
| 2010/0144315 A1 | 6/2010 | Jayasuriya et al. |
| 2012/0036442 A1 | 2/2012 | Dare et al. |
| 2013/0005488 A1* | 1/2013 | Evans .................. G06F 21/31 463/43 |
| 2013/0160141 A1* | 6/2013 | Tseng ................ G06F 21/6245 726/28 |
| 2013/0247172 A1 | 9/2013 | Okubo |
| 2014/0245282 A1 | 8/2014 | Keith, Jr. |
| 2015/0142974 A1 | 5/2015 | Bernaudin et al. |

FOREIGN PATENT DOCUMENTS

| | | |
|---|---|---|
| KR | 10-2005-0032816 A | 4/2005 |
| KR | 20140011488 A | 1/2014 |
| WO | 2005119493 A2 | 12/2005 |
| WO | 2013003556 A1 | 1/2013 |

\* cited by examiner

ELECTRONIC DEVICE AND METHOD FOR COMMONLY USING THE SAME

CROSS-REFERENCE TO RELATED APPLICATION(S)

This application claims the benefit under 35 U.S.C. § 119(a) of a Korean patent application filed on Aug. 12, 2015 in the Korean Intellectual Property Office and assigned Serial number 10-2015-0114117, the entire disclosure of which is hereby incorporated by reference.

TECHNICAL FIELD

The present disclosure relates to an electronic device and a method of providing an environment to commonly use the electronic device among users.

BACKGROUND

With the rapid development of the electronic technology, various types of electronic products have been developed and supplied. In particular, electronic devices having various functions, such as a smart phone, a tablet, a personal computer, etc., are widely used.

The above-mentioned electronic devices may be placed in a public space, e.g., a conference room in a company, a computer room in a school, etc., to allow users to commonly use the electronic devices. In this case, a manager of an electronic device allows only authorized users, i.e., members of the company or school, to share a password required to use the electronic device, and thus the use of the electronic device is limited to those having the required password for the electronic device.

In a case that the password required to use the electronic devices is shared, it is essentially unavoidable that users other than the authorized users may use the electronic device. In addition, since the same data are provided to all the users in the same setting status, the users cannot efficiently use the electronic device. Further, data used in the electronic device by the users remain in the electronic device, and thus a security issue may occur.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for commonly using the electronic device, which provide an environment in which users have opportunity to commonly use the electronic device.

In accordance with an aspect of the present disclosure, an electronic device includes a housing, a memory disposed in the housing, a communication circuit in communication with at least one external device, and a processor electrically connected to the memory and the communication circuit. The processor is configured to control for installing at least one application on the memory in response to a login request from a user, receiving a logout request from the user after the at least one application is installed, transmitting data associated with the at least one application to the at least one external device using the communication circuit in response to the logout request, and deleting at least a portion of the data associated with the at least one application and the at least one application from the memory.

In accordance with another aspect of the present disclosure, an electronic device includes a housing, a memory disposed in the housing, a communication circuit in communication with at least one external device, and a processor electrically connected to the memory and the communication circuit. The processor is configured to control for changing a setting state of the electronic device to a first setting state associated with a first user in response to a login request from the first user, receiving a login request from a second user while the first user logs in to the electronic device, receiving information on a second setting state associated with the second user from the at least one external device using the communication circuit in response to the login request from the second user, comparing information on the first setting state with the information on the second setting state, and to change the setting state of the electronic device based on at least a portion of the compared result.

In accordance with another aspect of the present disclosure, a method of commonly using an electronic device, includes installing at least one application in response to a login request from a user, receiving a logout request from the user after the at least one application is installed, transmitting data associated with the at least one application to at least one external device in response to the logout request, and deleting the data associated with the at least one application and at least a portion of the at least one application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
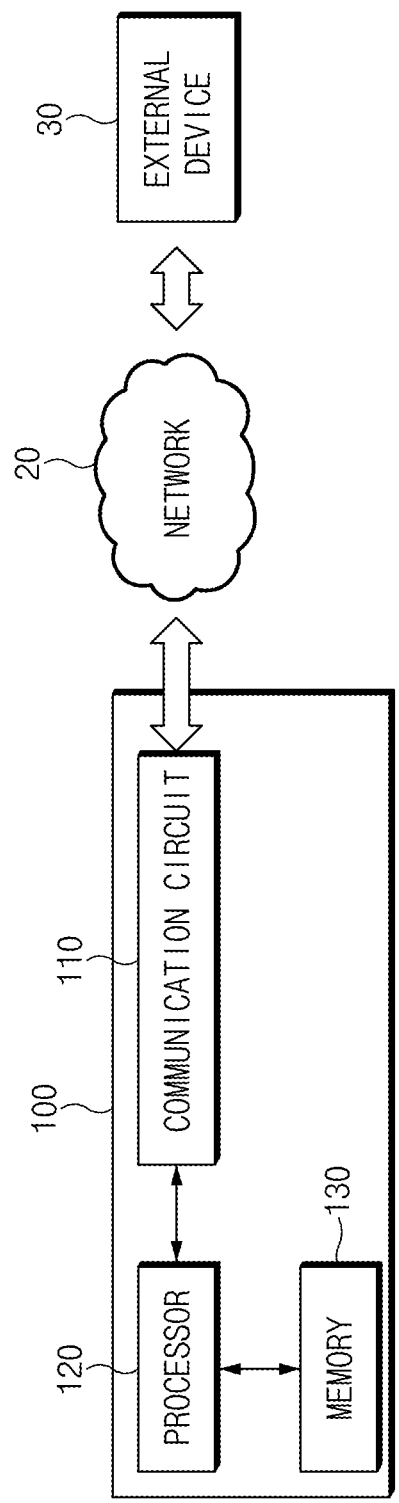
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of a smart phone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, a wearable device. According to various embodiments of the present disclosure, the wearable device may include at least one of accessory type wearable devices (e.g., watches, rings, bracelets, ankle bracelets, necklaces, glasses, contact lenses, or head-mounted-devices (HMDs)), textile/clothing type wearable devices (e.g., electronic apparels), body-attached type wearable devices (e.g., skin pads or tattoos), or bio-implantable type wearable devices (e.g., implantable circuits).

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. According to a certain embodiment of the present disclosure, an electronic device may be a flexible electronic. Also, electronic devices according to various embodiments of the present disclosure are not limited to the above-mentioned devices, and may include new electronic devices according to the development of technology.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device according to various embodiments of the present disclosure.

Referring to FIG. 1, an electronic device 100 may include a communication circuit 110, a processor 120, and a memory 130, and the electronic device 100 may be connected to an external device 30 through a network 20. The communication circuit 110, the processor 120, and the memory 130 may be placed in a housing of the electronic device 100.

The electronic device 100 may be a device placed in a public space to allow a plurality of users to commonly use the electronic device 100. When the users log in to the electronic device 100, the electronic device 100 may receive setting information and data from the external device 30 through the network 20 and provide a setting state and data, which are suitable for the login users, to the login users, and when the users log out, the electronic device 100 may transmit data to the external device 30 through the network 20, delete data, and initialize the setting state.

The communication circuit 110 may perform a communication with the external device 30. Responsive to a login request or a logout request from the user, the communication circuit 110 may transmit and receive data, account information, or setting information to and from the external device 30 according to various embodiments of the present disclosure.

The processor 120 may receive commands (or instructions) according to various embodiments of the present disclosure, decode the commands, and perform calculation or data processing according to the decoded commands. The processor 120 may execute the commands stored in the memory 130. The processor 120 may be implemented by a system-on-chip (SoC) configured to include a central processing unit (CPU), a graphic processing unit (GPU), a video processor, a memory, and the like.

According to an embodiment of the present disclosure, responsive to the logout request from the user, the processor 120 may transmit data stored in the electronic device 100 and associated with the user to the external device 30 through the network 20 by using the communication circuit 110. According to an embodiment of the present disclosure, responsive to the login request from a second user while a first user logs in to the electronic device, the processor 120 may transmit data stored in the electronic device 100 and associated with the first user to the external device 30 through the network 20 by using the communication circuit 110.

According to an embodiment of the present disclosure, illustrated in FIG. 1, the processor 120 may transmit the account information associated with the login user to the external device 30 using the communication circuit 110 depending on the user's login and receive data associated with the login user from the external device 30.

In the present disclosure, the data associated with the user may correspond to data that may be used in the electronic device 100 by a specific user. The data may be stored in the external device 30, and the data associated with the login user according to the user's login may be transmitted to the electronic device 100 from the external device 30 and used in the electronic device 100. In addition, the data associated with the logout user according to the user's logout may be transmitted to the external device 30 from the electronic device 100 and deleted in the electronic device 100. According to an embodiment of the present disclosure, the data may include data generated or changed by the electronic device 100 while the user requesting to log out is in the logged-in state. According to an embodiment of the present disclosure, the data may be data stored in the external device 30. The data may include various types of data, e.g., an application list associated with the user, application setting information (for example, a setting an interface of an application, an application list, or the like), a text file, an image file, a video file, a saved email list, and the like, which are stored or installed in the electronic device 100 or generated or changed by the electronic device 100.

According to an embodiment of the present disclosure, the processor 120 may transmit the account information on the user to the external device 30 using the communication circuit 110 according to the user's login. According to an embodiment of the present disclosure, the processor 120 may receive information on the setting state associated with the user from the external device 30. For example, when the account information of the user are transmitted to the external device 30 by the communication circuit 110, the processor 120 may receive the information on the setting state associated with the user and corresponding to the transmitted information from the external device 30.

According to an embodiment of the present disclosure, when the login request from the second user is received while the first user logs in to the electronic device, the processor 120 may receive information on the setting state associated with the second user from the external device 30.

According to an embodiment of the present disclosure, illustrated in FIG. 1, the processor 120 may receive initial setting information from the external device 30 using the communication circuit 110. For example, when the electronic device 100 is initially set (e.g., an initial booting of the electronic device 100), the processor 120 may initialize the setting state of the electronic device 100 after receiving the initial setting information, change the state of the electronic device 100 in response to the user's login, and return the state of the electronic device 100 to the initial state in response to the user's logout. As another example, to initialize the setting state of the electronic device 100 in response to the user's logout, the processor 120 may receive the initial setting information used to initialize the setting state of the electronic device 100 from the external device 30 using the communication circuit 110.

In the present disclosure, the account information may be used when the user is logged in to the electronic device, and the account information may include, for example, information, such as an identification (ID), a password, etc. The account information input to the electronic device may be transmitted to the external device 30 through the network 20 from the electronic device 100.

In the present disclosure, the information on the setting state (hereinafter, referred to as setting information) may be information used to control the state of the electronic device 100 or a software installed in the electronic device 100 in accordance with the user logged in to the electronic device 100. The setting information may include information used to control enable/disable or on/off state of modules of the electronic device 100, information used to set an access authority with respect to the modules of the electronic device 100, or information on an application installed in the electronic device 100. The information on application, which is to be installed in the electronic device 100, may include, for example, an identifier of the application (e.g., information on an application's name, an ID, or an address of a download server), a list of the application installed by the user, and an application package of the application to be installed. The setting information may be provided, for example, in the form of a set of instructions, the form of list, or the form of file. When the setting information are provided in the form of list or file, the setting information may be stored in the electronic device 100.

According to an embodiment of the present disclosure, the setting information may be differently set according to a user group to which the user belongs. For example, in the case that the electronic device 100 is commonly used in a company, the setting information may be differently set depending on a user's department or position.

Figure 2:
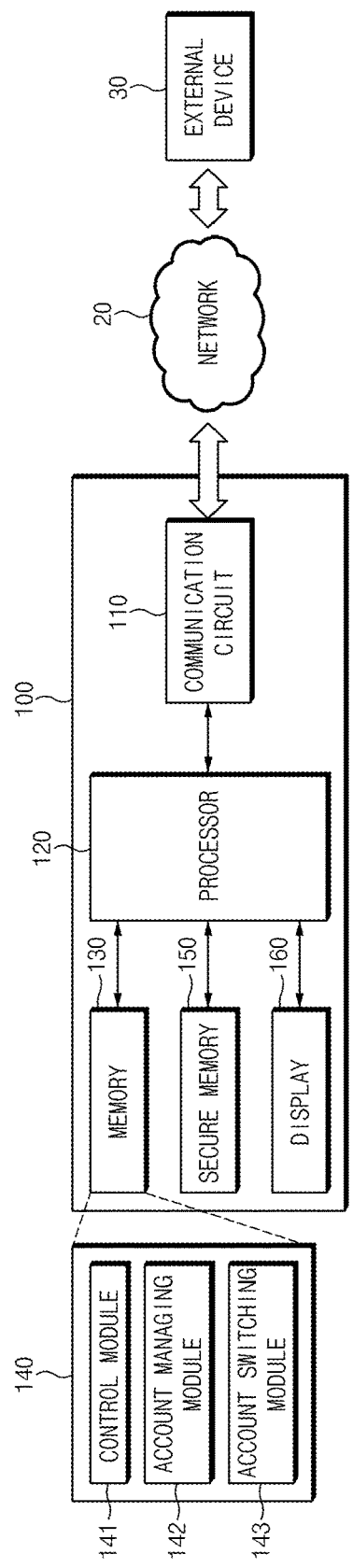
FIG. 2 is a block diagram illustrating a configuration of an electronic device according to various embodiments of the present disclosure.

In the present disclosure, with reference to FIGS. 1 and 2, the initial setting information may be information used to initialize the state of the electronic device 100 or a software installed in the electronic device 100. The initial setting information may be information used to control the state of the electronic device 100 or the software installed in the electronic device 100 while there is no logged-in user. The initial setting information may include information used to control enable/disable or on/off state of modules of the electronic device 100, information used to set an access authority with respect to the modules of the electronic device 100, or information on an application installed in the electronic device 100. The information on application, which is to be installed in the electronic device 100, may include, for example, an identifier of the application (e.g., information on an application's name, an ID, or an address of a download server) and a list of the application installed by the user, or may directly include an application package of the application to be installed. The initial setting information may be provided, for example, in the form of a set of instructions, the form of list, or the form of file. When the initial setting information are provided in the form of list or file, the initial setting information may be stored in the electronic device 100.

In the present disclosure, the setting state may indicate that the electronic device 100 is set by applying the setting information or the initial setting information to the electronic device (e.g., a state in which the modules are turned on/off or the application is installed according to information on the application to be installed). The setting state of the electronic device may be changed depending on the setting information or the initial setting information, which are provided from the external device 30 or previously stored.

According to an embodiment of the present disclosure, in the case that the login request from the user is received, the processor 120, illustrated in FIG. 1, may control the communication circuit 110 to transmit the account information of the user requesting the log-in to the external device 30 and to receive the setting information of the user requesting the log-in from the external device 30. The processor 120 may change the setting state of the electronic device on the basis of the received setting information.

According to an embodiment of the present disclosure, in the case that the login request from the user is received, the processor 120 may control the communication circuit 110 to transmit the account information of the user requesting the log-in to the external device 30 and to receive the setting information of the user requesting the log-in from the external device 30.

According to an embodiment of the present disclosure, the processor 120 may delete the data stored in the electronic device 100 and initialize the setting state of the electronic device 100. That is, when the logout request is received from the user, the processor 120 may return the state of the electronic device 100 to the state before the user is logged in to the electronic device 100. For instance, the processor 120 may delete or initialize the installed application and the data generated or changed by the application in response to the user's login. According to an embodiment of the present disclosure, the processor 120 may determine whether the transmission of the data to the external device is completed by the communication circuit 110, and when the transmission of the data is completed, the processor 120 may delete the data and initialize the setting state of the electronic device 100.

According to an embodiment of the present disclosure, the processor 120 may initialize the setting state of the electronic device 100 on the basis of the initial setting information provided through the communication circuit 110 or the previously-stored initial setting information.

According to an embodiment of the present disclosure, the processor 120 may change the setting state of the electronic device 100 based on the setting information provided through the communication circuit 110. For example, the processor 120 may change the setting state of the electronic device 100 to the setting state of the first user from the initial setting state or to the setting state of the second user from the setting state of the first user. For example, when the login request of the second user is received while the first user logs in to the electronic device, the processor 120 may change the setting state of the electronic device 100 based on the setting information of the second user, which are provided through the communication circuit 110.

With reference to FIGS. 1 and 2, according to various embodiments of the present disclosure, in the case that the setting information of the first user are provided in the form of the set of instructions, the processor 120 may compare the setting state of the electronic device 100 with the setting information of the second user provided through the communication circuit 110 to change the setting state. According to an embodiment of the present disclosure, when the setting state of the electronic device 100 are different from the setting information, the processor 120 may change the setting state of the electronic device 100, and when the setting state of the electronic device 100 are the same as the setting information, the processor 120 may maintain the setting state of the electronic device 100 without changing the setting state. For example, in a case that the electronic device 100 is set to not allow access to a Wi-Fi module and the setting information include an instruction allowing the access to the Wi-Fi module, the processor 120 may change the setting state of the electronic device 100 such that the access to the Wi-Fi module is allowed since the setting state of the electronic device 100 is different from the setting information.

According to an embodiment of the present disclosure, in the case that the setting information of the first user are stored in the form of the list or file, the processor 120 may compare the setting information of the first user with the setting information of the second user to change the setting state of the electronic device 100. According to an embodiment of the present disclosure, when the setting information of the first user are different from the setting information of the second user, the processor 120 may change the setting state of the electronic device 100, and when the setting information of the first user are the same as the setting information of the second user, the processor 120 may maintain the setting state of the electronic device 100. For example, in a case that the setting information of the first user include an instruction allowing access to a camera module and the setting information of the second user include an instruction allowing the access to the camera module, the processor 120 may maintain the setting state of the electronic device 100.

The memory 130, illustrated in FIGS. 1 and 2, may include a volatile or non-volatile memory. The memory 130 may store, for example, instructions or data associated with the communication circuit 110, the processor 120, or the display (e.g., a display 160 shown in FIG. 2) of the electronic device 100. The memory 130 may include instructions executed by the processor 120.

According to an embodiment of the present disclosure, the memory 130 may store the data, the initial setting information, and the setting information provided from the external device 30 through the network 20.

The network 20 may connect the electronic device 100 and the external device 30 to allow the electronic device 100 including the communication circuit 110 to transmit and receive data to and from the external device 30. The network 20 may be, but not limited to, a telecommunications network. The telecommunications network may include at least one of a computer network, an internet, an internet of things, or a telephone network.

The external device 30 may be connected to the electronic device 100 through the network 20. The external device 30 may store the user account information, the data, the initial setting information and/or the setting information. The external device 30 may compare the account information provided from the electronic device 100 with the user account information stored in the external device 30 to allow the user to login. The external device 30 may be, but not limited to, a computing device configured to include the processor and the memory to process the request from the electronic device 100 or the data and store the data.

In FIG. 1, the external device 30 may be provided as one device, but it should not be limited thereto. For example, the external device 30 may be implemented by a plurality of server groups configured to include a server (e.g., a mobile device management (MDM) server) storing the initial setting information and the setting information, a server storing the data, a server storing the user account information, and the like.

FIG. 2 is a block diagram illustrating a configuration of an electronic device according to various embodiments of the present disclosure. For the convenience of explanation, a description of those elements already described above with reference to FIG. 1 will not be repeated here.

Referring to FIGS. 1 and 2, an electronic device 100 may include a communication circuit 110, a processor 120, a memory 130, a secure memory 150, and the display 160. The electronic device 100 may be connected to an external device 30 through a network 20. The communication circuit 110, the processor 120, the memory 130, the secure memory 150, and the display 160 may be placed in a housing of the electronic device 100.

The processor 120 may be set to execute a calculation process or a data processing process through a control module 141, an account managing module 142, and an account switching module 143, which are stored in the memory 130.

According to an embodiment of the present disclosure, the memory 130 may store a software module 140 configured to include the control module 141, the account managing module 142, and the account switching module 143.

The control module 141 may provide an environment in which a plurality of users may commonly use the electronic device 100 according to various embodiments of the present disclosure. The control module 141 may be configured to control the account managing module 142 and the account switching module 143 in response to the login or logout of the user. In addition, the control module 141 may be configured to control the communication circuit 110, the processor 120, the memory 130, the secure memory 150, and the display 160 of the electronic device 100. According to an embodiment of the present disclosure, in a case that an idle state in which the user does not use the electronic device 100 persists for more than a predetermined time, the control module 141 may control the electronic device 100 to allow the user to be automatically logged out. According to an embodiment of the present disclosure, the control module 141 may provide personal information, such as a user ID, a user name, a user picture, etc., through the display 160 in response to the user's login. According to an embodiment of the present disclosure, when the logout request is received from the user or the login request is received from another user, the control module 141 may transmit the data of the user who is logged in to the external device 30 and delete the data of the user who is logged in.

The account managing module 142 may provide an environment in which the user is logged in according to various embodiments of the present disclosure. According to an embodiment of the present disclosure, the account managing module 142 may provide the user with a screen through the display 160 such that the user inputs the account information through the screen. In a case that the user inputs the account information through the provided screen, the account managing module 142 may transmit the account information to the external device 30 through the network 20 and allow the user to log in after receiving authentication from the external device 30. When the authentication is successful in the external device 30, the account managing module 142 may receive, for example, the authenticating result and token from the external device 30.

According to an embodiment of the present disclosure, the account managing module 142 may provide the user with a screen through the display 160 such that the user is quickly logged in by setting a security code (e.g., a personal identification number (PIN), a pattern, a fingerprint, or the like). The account managing module 142 may receive a code from the user through the provided screen, set the received code as the security code, and store the set security code in the secure memory 150. When the electronic device 100 is in locked state, the account managing module 142 may receive the security code from the user and compare the security code from the user with the security code stored in the secure memory 150 to unlock the electronic device 100.

The account switching module 143 may change the setting state of the electronic device 100 in response to the user's login. According to an embodiment of the present disclosure, the account switching module 143 may request the setting information on the logged in user to the external device 30 through the network 20 and apply the received setting information to the electronic device 100, to thereby change the setting state of the electronic device 100.

The control module 141, the account managing module 142, and the account switching module 143 may perform the above-described operations by using the processor 120.

The secure memory 150 may be a memory, e.g., a volatile or non-volatile memory, which is protectable from any kind of information leakage caused by hacking. The secure memory 150 may be a module built in the electronic device 100 as shown in FIG. 2, but it should not be limited thereto or thereby. That is, the secure memory 150 may be an external module not built in the electronic device 100. According to an embodiment of the present disclosure, when the security code for the quick login is set, the secure memory 150 may receive and store the security code. The security code stored in the secure memory 150 may be compared with the security code input by the user in the locked state, and the locked state may be unlocked when the security code stored in the secure memory 150 is matched with the security code input by the user. The security code stored in the secure memory 150 may be deleted when the logout request is received from the user.

The display 160, illustrated in FIGS. 3, 4, 5A, 5B, 6A, and 6B, may include, for example, a liquid crystal display or an organic light emitting display and a touch panel. According to an embodiment of the present disclosure, in the case that the user is logged in, the display 160 may output the personal information, such as the user ID, the user name, the user picture, etc. According to an embodiment of the present disclosure, in the case that the user is logged in, the display 160 may provide the user with a security code setting screen through which the user may set the security code for the quick login. According to an embodiment of the present disclosure, the display 160 may provide the user with a security code input screen through which the user may input the security code under the locked state. According to an embodiment of the present disclosure, in the case that the user logs out, the display 160 may output an account information input screen through which the account information on the user are received. Hereinafter, the screens output through the display 160 will be described in detail with reference to FIGS. 3, 4, 5A, and 5B.

Figure 3:
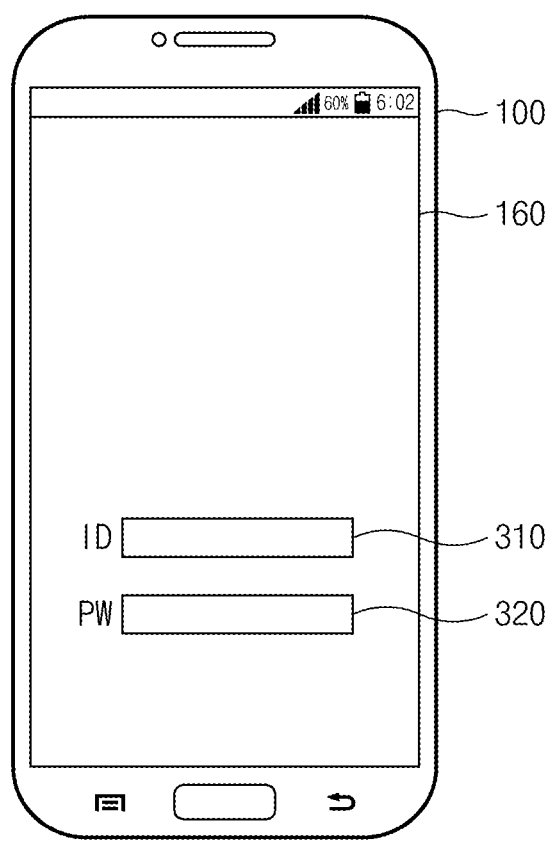
FIG. 3 is a view illustrating a user interface displayed in a display according to various embodiments of the present disclosure.

FIG. 3 is a view illustrating a user interface displayed in a display according to various embodiments of the present disclosure.

Referring to FIG. 3, the electronic device 100 may display a login interface through the display 160 in a state during which the user does not login to receive the account information from the user for the user's login. According to an embodiment of the present disclosure, the login interface may include a user identification (ID) input area 310 and a user password input area 320.

According to an embodiment of the present disclosure, the user may input the user ID to the user ID input area 310 displayed through the display 160 and input the use password to the user password input area 320 displayed through the display 160. The user may log in to the electronic device 100 by respectively inputting the user ID and the user password (PW) to the user ID input area 310 and the user password input area 320.

According to an embodiment of the present disclosure, when the user logs out due to the logout request from the user, the electronic device 100 may display the login interface configured to include the user ID input area 310 and the user password input area 320 through the display 160 to receive the account information of the logged-out user or another arbitrary user.

In the case that the account information are provided to the electronic device 100 through the login interface, the electronic device 100 (e.g., the control module 141) may transmit the account information to the external device 30 using the communication circuit 110 and receive the data and the setting information from the external device 30 after receiving the authentication about the account information from the external device 30.

Figure 4:
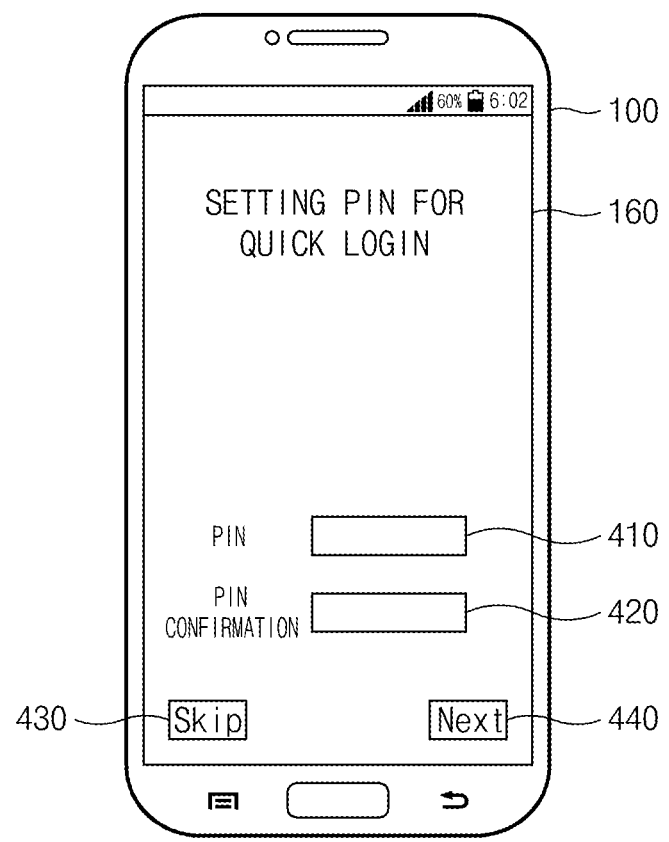
FIG. 4 is a view illustrating a user interface displayed in a display according to various embodiments of the present disclosure.

FIG. 4 is a view illustrating a user interface displayed in a display according to various embodiments of the present disclosure.

Referring to FIG. 4, the electronic device 100 may display a security code setting interface in the locked state after the user is logged in through the display 160 to set the security code for the quick login. According to an embodiment of the present disclosure, the security code setting interface may include a security code input area 410, a security code confirmation area 420, a setting skip object 430, and a setting approval object 440.

According to an embodiment of the present disclosure, the user may input the code to the security code input area 410 displayed in the display 160 and input the same code as the code input to the security code input area 410 to the security code confirmation area 420. According to an embodiment of the present disclosure, the user may input a security code setting instruction using the setting approval object 440 displayed in the display 160 after inputting the same code to the security code input area 410 and the security code confirmation area 420.

According to an embodiment of the present disclosure, the user may input a security code setting skip instruction using the setting skip object 430 displayed in the display 160.

FIG. 4 shows the security code setting interface to set the security code configured to include characters, but it should not be limited thereto or thereby. That is, the electronic device 100 may display various types of security code setting interfaces to set various types of security codes, e.g., a pattern, a biometric information (e.g., a fingerprint, an iris, etc.), or the like.

In the case that the code is provided to the electronic device 100 through the security code setting interface, the electronic device 100 may set the received code to the security code of the login user and may store the security code in the secure memory 150. The security code stored in the secure memory 150 may be deleted when the logout request is received from the user.

Figure 5A:
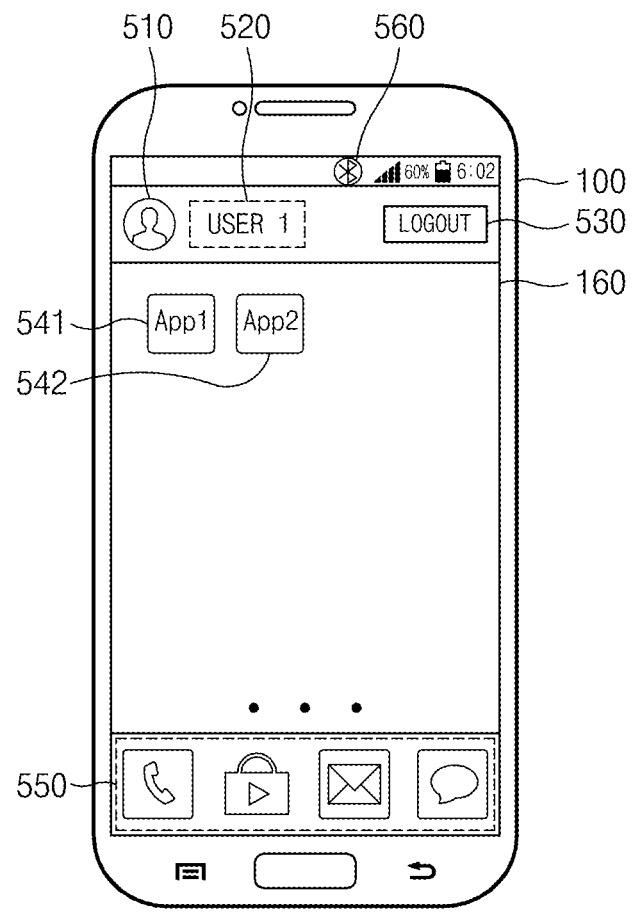
FIGS. 5A and 5B are views illustrating user interfaces displayed in a display according to various embodiments of the present disclosure.
Figure 5B:
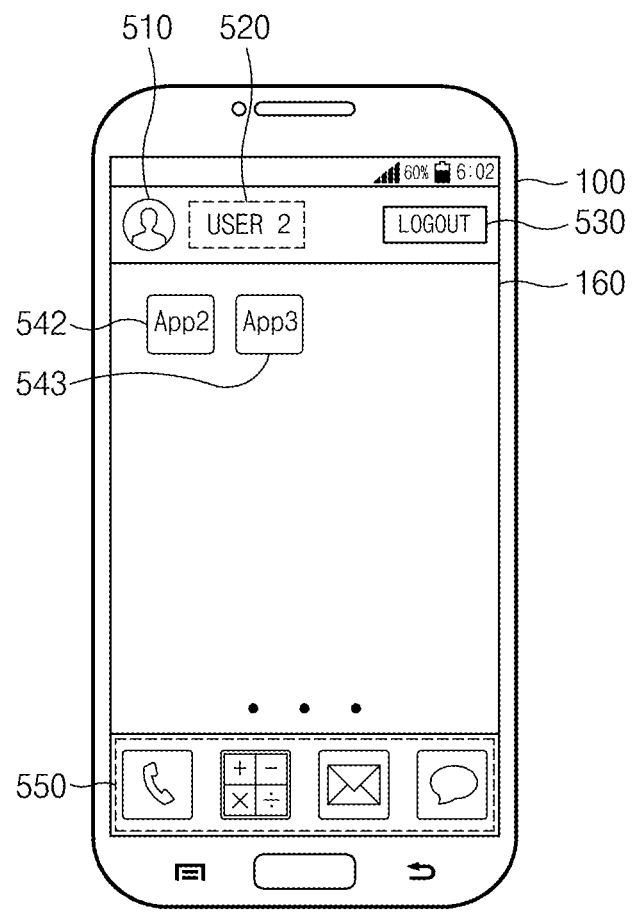

FIGS. 5A and 5B are views illustrating user interfaces displayed in a display according to various embodiments of the present disclosure.

Referring to FIG. 5A, when the user is logged in, the electronic device 100 may display a personal information display interface through the display 160 to provide the personal information of the login user. According to an embodiment of the present disclosure, the personal information display interface may include a picture display area 510, an ID display area 520, and a logout request object 530.

According to an embodiment of the present disclosure, when the first user is logged in, the electronic device 100 may receive one or more information of the personal information, such as the picture, the ID, or the like, of the login first user from the external device 30, display the picture of the first user through the picture display area 510 displayed in the display 160, and display the ID of the first user through the ID display area 520 displayed in the display 160. According to an embodiment of the present disclosure, the first user may input a logout request instruction using the logout request object 530 displayed in the display 160.

According to an embodiment of the present disclosure, the electronic device 100 may display an icon 541 of a first application and an icon 542 of a second application, which are installed based on the setting information on the user provided in accordance with the login of the first user, and in the case that a Bluetooth (BT) communication is activated according to the setting information, the electronic device 100 may display a BT icon 560.

According to an embodiment of the present disclosure, the electronic device 100 may display an application list (e.g., icons associated with a telephone call, an application market, an email, and an SMS message), which is set by the first user based on the data provided according to the login of the first user, in an application area 550.

In the case that the logout request of the user is provided to the electronic device 100 through the personal information display interface, the electronic device 100 may transmit the data to the external device 30 in response to the logout request, delete the data, and initialize the setting state of the electronic device 100.

Referring to FIG. 5B, when the second user is logged in, the electronic device 100 may receive one or more information related to personal information, such as the picture, the ID, or the like, of the login second user from the external device 30, display the picture of the second user through the picture display area 510 displayed in the display 160, and display the ID of the second user through the ID display area 520 displayed in the display 160. According to an embodiment of the present disclosure, the second user may input the logout request instruction using the logout request object 530 displayed in the display 160.

According to an embodiment of the present disclosure, the electronic device 100 may display the icon 542 of the second application and an icon 543 of a third application, which are installed based on the setting information of the user provided in accordance with the login of the second user, and in the case that the BT communication is inactivated according to the setting information, the electronic device 100 may not display the BT icon.

According to an embodiment of the present disclosure, the electronic device 100 may display an application list (e.g., icons associated with a telephone call, a calculator, an email, and an SMS message), which is set by the second user based on the data provided according to the login of the second user, in an application area 550.

In FIGS. 5A and 5B, the personal information display interface may be configured to display the picture and the ID of the login user in an upper portion of the display 160, but it should not be limited thereto or thereby. That is, the personal information display interface may be configured to display other personal information, such as a name, group to which the login user belongs, or position of the login user, and may be configured to display the personal information in an arbitrary area of the display 160, e.g., a left end portion, a right end portion, a lower end portion, or the like.

Figure 6A:
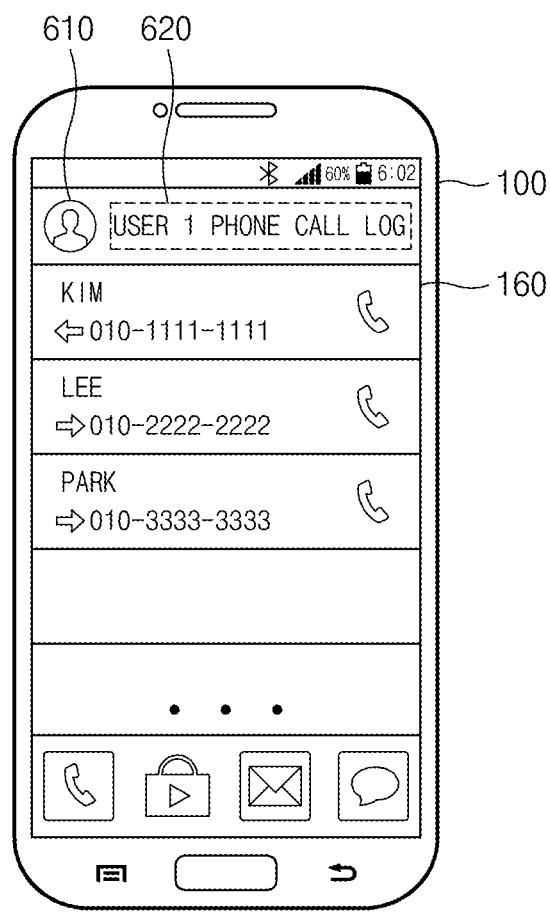
FIGS. 6A and 6B are views illustrating user interfaces displayed in a display according to various embodiments of the present disclosure.
Figure 6B:
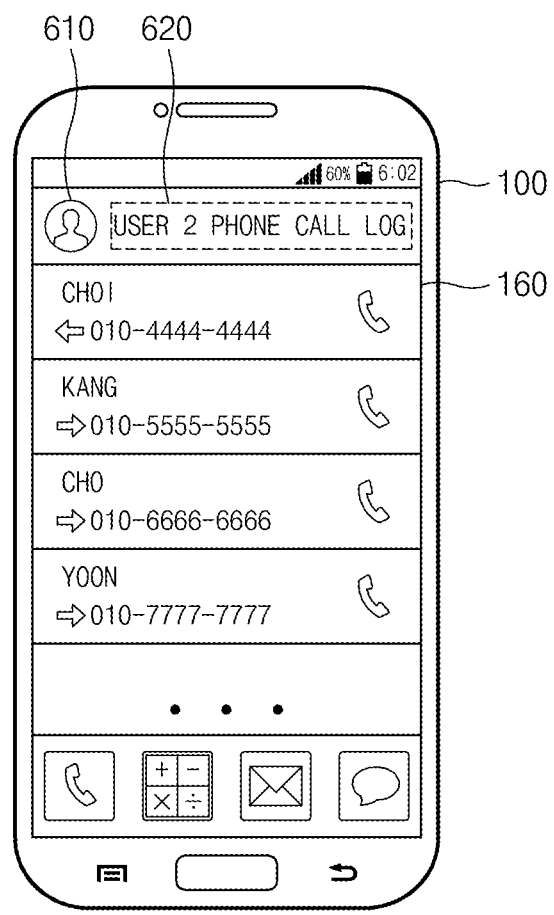

FIGS. 6A and 6B are views illustrating user interfaces displayed in a display according to various embodiments of the present disclosure.

Referring to FIGS. 6A and 6B, the electronic device 100 may install a phone call application based on the initial setting information or the user setting information and provide the first user and the second user with the phone call application. According to an embodiment of the present disclosure, the phone call application may be differently provided depending on the first user and the second user based on data associated with the phone call application included in data associated with each user.

In an embodiment of the present disclosure, the electronic device 100 may display the personal information display interface through the display 160 to provide the personal information of the user who is logged in. According to an embodiment of the present disclosure, the personal information display interface may include a picture display area 610 and an ID display area 620.

Referring to FIG. 6A, the electronic device 100 may display, for example, a phone call log of the first user. The data of the first user, which are provided in accordance with the login of the first user, may include phone call log data. The electronic device 100 may display the phone call log of the first user based on the data of the first user.

According to an embodiment of the present disclosure, when the first user is logged in, the electronic device 100 may receive one or more information of the personal information, such as the picture, the ID, or the like, of the logged-in first user from the external device 30. The electronic device 100 may display the picture of the first user through the picture display area 610 displayed in the display 160 and display the ID of the first user through the ID display area 620 displayed in the display 160.

Referring to FIG. 6B, the electronic device 100 may display, for example, a phone call log of the second user. That is, the electronic device 100 may display different phone call logs of calls sent and/or received depending on the logged-in user. As shown in FIGS. 6A and 6B, the phone call log of the first user may be different from the phone call log of the second user. The electronic device 100 may display the phone call log of the second user based on data of the second user, which are provided according to the login of the second user.

According to an embodiment of the present disclosure, when the second user is logged in, the electronic device 100 may receive one or more information of the personal information of the logged-in second user from the external device 30. The electronic device 100 may respectively display the picture and the ID of the second user through the picture display area 610 and the ID display area 620.

FIGS. 6A and 6B show the user interface that displays the phone call log of the logged-in user in the phone call application, but the user interface should not be limited to displaying the phone call application. That is, the electronic device 100 may display a user interface displaying an email list of the logged-in user in an email application or a user interface displaying a file list showing files recently used by the logged-in user in an electronic document editing application, and the like.

Figure 7:
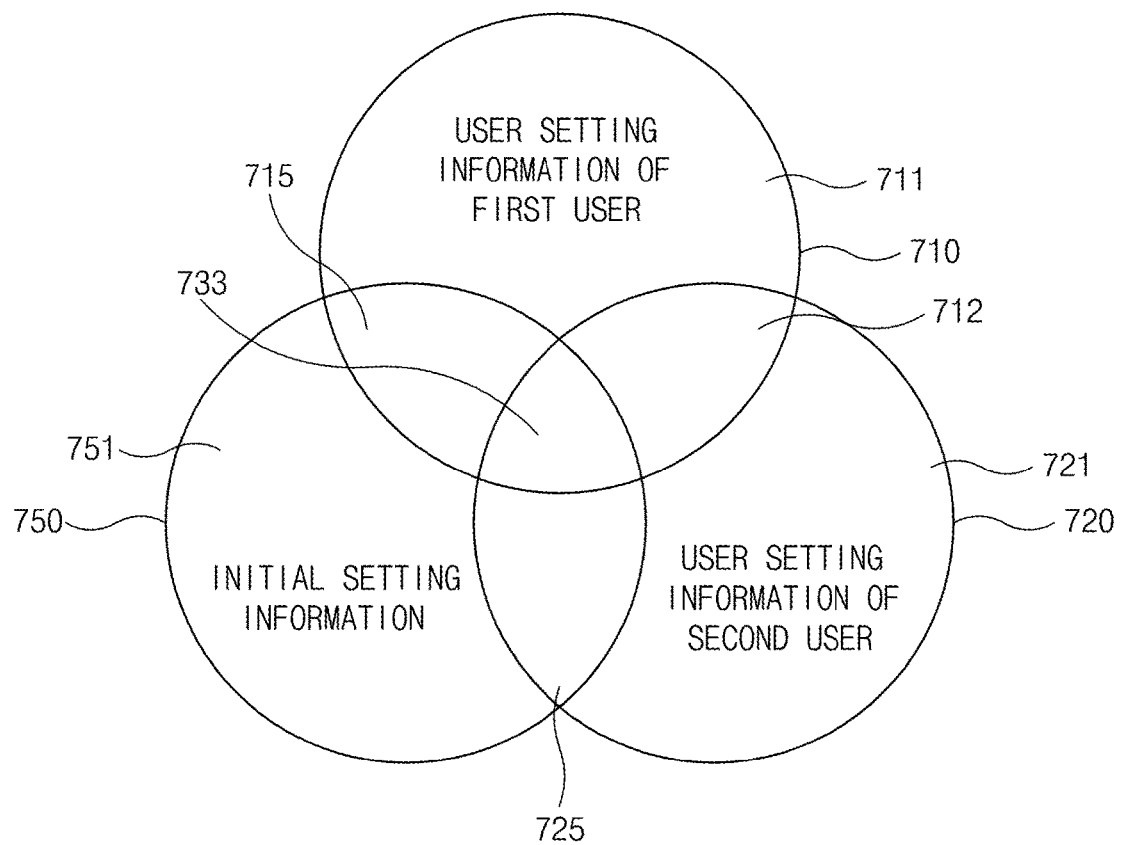
FIG. 7 is a view illustrating a relation between initial setting information and setting information according to various embodiments of the present disclosure.

FIG. 7 is a view illustrating a relation between initial setting information and setting information according to various embodiments of the present disclosure.

Referring to the Venn diagram illustrated in FIG. 7, the initial setting information 750, the setting information of the first user 710, and the setting information of the second user 720 may include the same setting information as each other and different setting information from each other.

For example, the initial setting information 750 and the setting information of the first user 710 may include the same setting information corresponding to areas 715 and 733 and include different setting information corresponding to areas 711 and 751. The initial setting information 750 and the setting information of the second user 720 may include the same setting information corresponding to areas 725 and 733 and include different setting information corresponding to areas 721 and 751. The setting information of the first user 710 and the setting information of the second user 720 may include the same setting information corresponding to areas 712 and 733 and include different setting information corresponding to areas 711 and 721.

According to an embodiment of the present disclosure, the processor 120 of the electronic device 100 may compare the setting information of the first user 710 and the setting information of the second user 720, maintain the setting state corresponding to the same setting information corresponding to the areas 712 and 733, and change the setting state corresponding to the different setting information corresponding to the areas 711 and 721.

According to an embodiment of the present disclosure, the setting state corresponding to the setting information of the area 712 may be a state in which the second application shown in FIGS. 5A and 5B is installed, and the setting state corresponding to the setting information of the area 711 may be a state in which the BT communication is activated. The processor 120 of the electronic device 100 may maintain the state, in which the second application is installed, corresponding to the setting state corresponding to the same setting information (or may not delete the application), and may change the state, in which the BT communication is activated, corresponding to the setting state corresponding to the different setting information to the state in which the BT communication is deactivated.

According to an embodiment of the present disclosure, the setting state corresponding to the setting information of the area 733 may be a state in which the phone call application shown in FIGS. 5A, 5B, 6A, and 6B is installed. The phone call application installed based on the initial setting information 750 may be maintained even though the user is changed.

Figure 8:
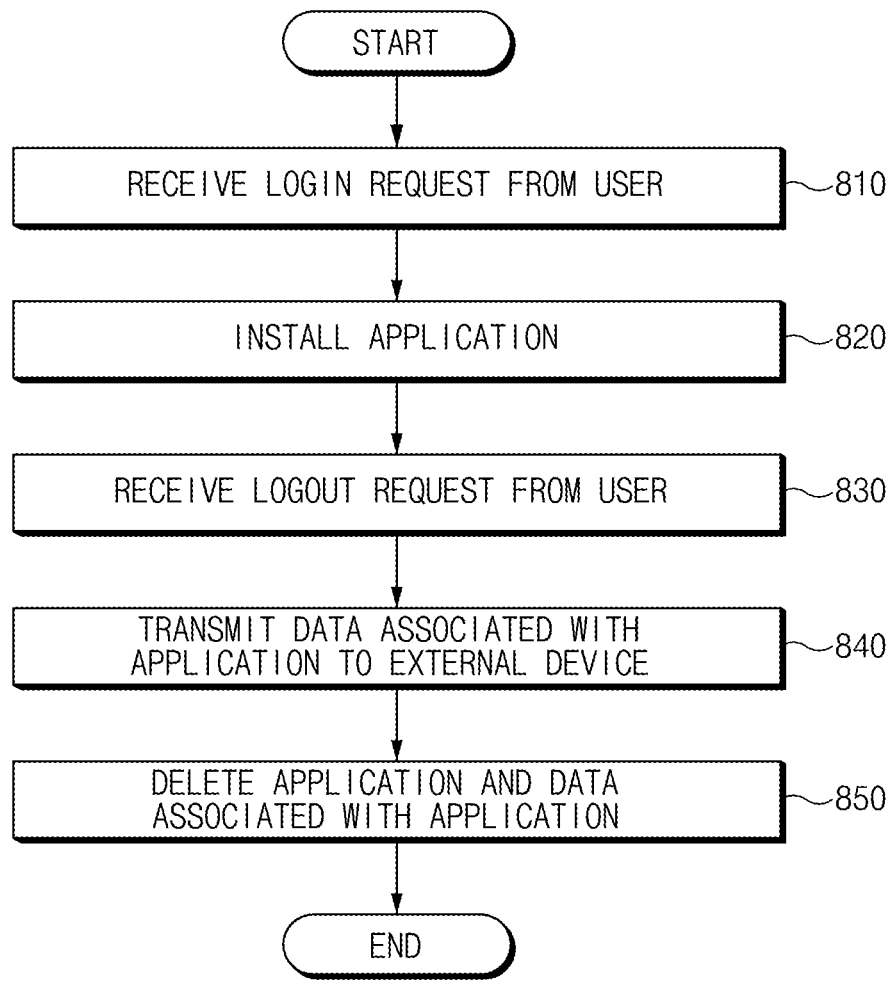
FIG. 8 is a flowchart illustrating a method for commonly using an electronic device according to various embodiments of the present disclosure.

FIG. 8 is a flowchart illustrating a method for commonly using an electronic device according to various embodiments of the present disclosure.

The flowchart shown in FIG. 8 may be configured to include operations processed by the electronic device 100 shown in FIG. 1 or the electronic device 100 shown in FIG. 2. Accordingly, even though descriptions are omitted below, descriptions associated with the electronic device 100 shown in FIG. 1 or the electronic device 100 shown in FIG. 2 may be applied to the flowchart shown in FIG. 8.

Referring to FIG. 8, the electronic device 100 (e.g., the account managing module 142) may receive the login request from the user through the user interface in operation 810. For example, the electronic device 100 may receive the account information including the ID and the password from the user through the login interface (illustrated in FIG. 3, for example).

In operation 820, the electronic device 100 (e.g., the account switching module 143) may install at least one application in response to the login request from the user. In the case that the user is logged in, the electronic device 100 may receive the data and the setting information of the logged-in user from the external device 30.

The electronic device 100 may install an application in the electronic device 100 based on information on the application, which are included in the setting information. For example, in a case that an application identifier is included in the setting information, the electronic device 100 may receive an application package from the external device 30 based on the application identifier and install the application using the received application package. As another example, in a case that the application package is included in the setting information, the electronic device 100 may install the application using the application package.

In operation 830, shown in FIG. 8, the electronic device 100 (e.g., the control module 141 or the account managing module 142, shown in FIG. 2) may receive the logout request from the user through the user interface while the user is logged in. For example, the electronic device 100 may be set to allow the logout request to be automatically generated when the idle state of the electronic device 100 is continued for a predetermined period.

When the logout request is received, the electronic device 100 (e.g., the account switching module 143) may transmit the data associated with the installed application to the external device 30 in operation 840. According to an embodiment of the present disclosure, the electronic device 100 may identify the data of the user requesting to log out and may transmit all data stored in the electronic device 100. For example, the data associated with the application may include, for example, data provided from the external device 30 when the user is logged in and data generated or changed by the installed application while the user is logged in. The data of the user requesting to log out may be backed-up since the electronic device 100 transmits the data to the external device 30.

According to an embodiment of the present disclosure, the electronic device 100 may determine whether the data are completely transmitted to the external device 30. For example, the external device 30 may determine whether the data from the electronic device 100 are completely received and may transmit the determined result to the electronic device 100 when the reception of the data is completed. The electronic device 100 may determine whether the transmission of the data is completed when receiving the determined result from the external device 30.

When the transmission of the data is completed, the electronic device 100 (e.g., the control module 141) may delete the transmitted data and the installed application in operation 850. For example, the electronic device 100 may identify the data transmitted in operation 840 and delete at least a portion of the data of the user who is requested to be logged out. In addition, the electronic device 100 may identify the application installed in operation 820 and delete at least a portion of the application associated with the user who is requested to be logged out.

According to an embodiment of the present disclosure, the electronic device 100 may initialize the setting state of the electronic device 100 after the data are deleted. According to an embodiment of the present disclosure, the electronic device 100 may initialize the setting state of the electronic device 100 based on the initial setting information. According to an embodiment of the present disclosure, the electronic device 100 may receive the initial setting information from the external device 30. According to an embodiment of the present disclosure, the initial setting information may be information previously stored in the electronic device 100. For example, in the case that the initial setting information are previously stored in the electronic device 100, the electronic device 100 may apply the previously-stored initial setting information, and in the case that the initial setting information are not stored in the electronic device 100, the electronic device 100 may receive the initial setting information from the external device 30 and apply the received initial setting information.

Although not shown in FIG. 8, when the logout is completed after operation 850 is executed, the electronic device 100 (e.g., the account managing module 142) may display the login interface to receive the account information of the user.

As described above, the data associated with the user may be stored in the external device 30 and deleted in the electronic device 100 according to the logout request, and thus the security of the data may be maintained. In addition, since the changed setting state of the electronic device 100 may be initialized by the logout request, usability of the electronic device 100 commonly used by the users may be improved.

Figure 9:
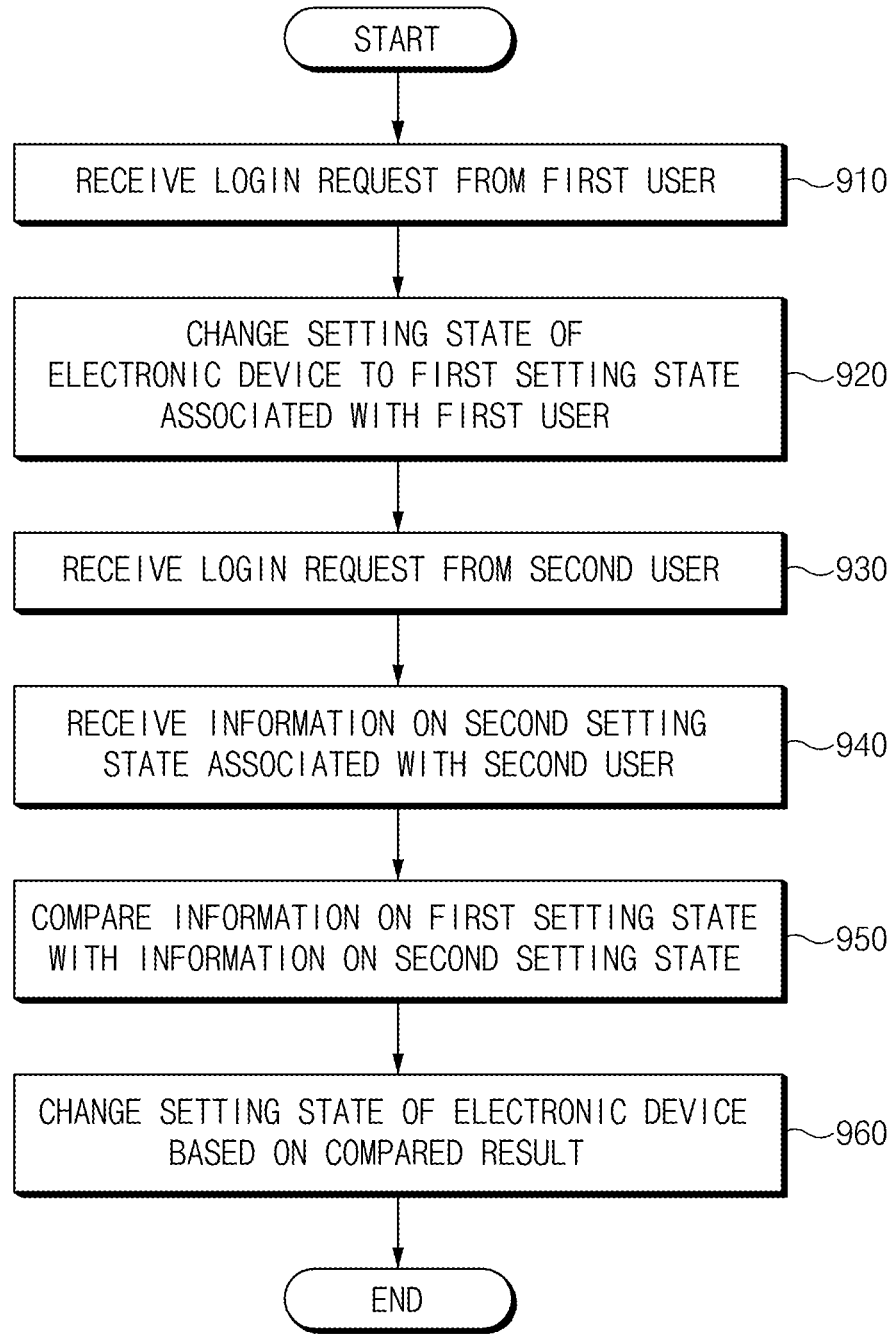
FIG. 9 is a flowchart illustrating a method for commonly using an electronic device according to various embodiments of the present disclosure.

FIG. 9 is a flowchart illustrating a method for commonly using an electronic device according to various embodiments of the present disclosure.

The flowchart shown in FIG. 9 may be configured to include operations processed by the electronic device 100 shown in FIG. 1 or the electronic device 100 shown in FIG. 2. Accordingly, even though descriptions are omitted below, descriptions associated with the electronic device 100 shown in FIG. 1 or the electronic device 100 shown in FIG. 2 may be applied to the flowchart shown in FIG. 9.

Referring to FIG. 9, the electronic device 100 (e.g., the account managing module 142, shown in FIG. 2) may receive the login request from the first user through the user interface in operation 910. For example, the electronic device 100 may receive the account information including the ID and the password from the first user through the login interface.

In operation 920, the electronic device 100 (e.g., the account switching module 143) may change the setting state of the electronic device 100 to a first setting state associated with the first user in response to the login request from the first user. In the case that the first user is logged in, the electronic device 100 may receive the setting information of the first user from the external device 30. The electronic device 100 may change the setting state of the electronic device 100 to the first setting state based on the setting information of the first user. The electronic device 100 may install an application associated with the first user based on the setting information of the first user.

In operation 930, the electronic device 100 (e.g., the account managing module 142) may receive the login request from the second user while the first user is logged in. For example, the electronic device 100 may display a login interface to receive the login request from other users while the first user is logged in. When the second user requests for the output of the login interface, the electronic device 100 may receive the account information of the second user through the login interface, and thus the electronic device 100 may receive the login request from the second user.

When the login request of the second user is received, the electronic device 100 (e.g., the account switching module 143) may receive the setting information of the second user from the external device 30 in operation 940. For example, when the electronic device 100 transmits the account information of the second user or the information used to identify the second user to the external device 30, the external device 30 may transmit the setting information of the second user to the electronic device 100. The electronic device 100 may receive the setting information of the second user from the external device 30.

When the setting information of the second user is received, the electronic device 100 may change the setting state of the electronic device 100 based on the setting information of the second user. For example, the electronic device 100 may execute instructions included in the setting information of the second user, and thus the setting state of the electronic device 100 may be changed.

According to an embodiment of the present disclosure, in operation 950, shown in FIG. 9, the electronic device 100 (e.g., the account switching module 143) may compare the setting information of the first user with the setting information of the second user.

According to an embodiment of the present disclosure, the electronic device 100 may compare instructions included in the setting information of the first user with instructions included in the setting information of the second user. According to an embodiment of the present disclosure, the setting state of the electronic device 100 may be compared with the setting information of the second user. For example, the electronic device 100 may determine the setting state of the electronic device 100 configured to include an enable state or a disable state and may compare the determined setting state with the instructions included in the setting information of the second user.

According to an embodiment of the present disclosure, the electronic device 100 may compare a list of applications installed in accordance with the setting information of the first user with a list of applications installed in accordance with the setting information of the second user.

According to an embodiment of the present disclosure, the operation 950 may be executed after determining whether the setting information of the first user are stored in the electronic device 100. For example, when the setting information are provided in the form of file or list, the electronic device 100 may search the setting information of the first user and determine that the setting information are stored. In the case that the setting information of the first user are stored in the electronic device 100, the electronic device 100 may compare the setting information of the first user with the setting information of the second user. As another example, when the setting information are provided in the form of the set of instructions, the electronic device 100 may determine that the setting information of the first user are not stored in the electronic device 100. In the case that the setting information of the first user are not stored in the electronic device 100, the electronic device 100 may compare the first setting state of the electronic device 100 with the setting information of the second user.

When the setting state of the electronic device 100 or the setting information of the first user is compared with the setting information of the second user, the electronic device 100 (e.g., the account switching module 143) may change the setting state of the electronic device 100 based on the setting information which are determined to be different from each other after being compared with each other in operation 960, as shown in FIG. 9.

For example, a first setting of the electronic device 100 may be the enable state, a second setting of the electronic device 100 may also be the enable state, a first instruction included in the setting information of the second user may be an instruction to maintain the first setting to the enable state, and a second instruction included in the setting information of the second user may be an instruction to change the second setting to the disable state. In this case, the electronic device 100 may apply only the second instruction to change the second setting of the electronic device 100 to the disable state.

As another example, a first instruction included in the setting information of the first user may be an instruction to change the first setting and the second setting to the enable state, the first instruction included in the setting information of the second user may be an instruction to change the first setting to the disable state, and the second instruction included in the setting information of the second user may be an instruction to change the second setting to the enable state. In this case, the electronic device 100 may apply only the first instruction of the second setting information to change the first setting of the electronic device 100 to the disable state.

As another example, the application installed in accordance with the setting information of the first user may be the first application and the second application, and the application installed in accordance with the setting information of the second user may be the second application and the third application. In this case, the electronic device 100 may maintain the same second application according to the compared result, delete the different first application according to the compared result, and install the third application.

As described above, when the user is switched, the setting state of the electronic device 100 may be partially changed, and thus a time required to apply the setting information to the electronic device 100 and a time required to install the application on the electronic device 100 may be reduced.

According to some embodiments of the present disclosure, after the operation 960 is executed, the electronic device 100 (e.g., the account switching module 143) may determine whether the change of the setting state of the electronic device 100 is completed, and when the change of the setting state is completed, the electronic device 100 may transmit the data of the first user to the external device 30.

When the transmission of the data of the first user is completed, the electronic device 100 may delete the data of the first user and receive the data of the second user from the external device 30. For example, when the electronic device 100 transmits the setting information of the second user or the information used to identify the second user to the external device 30, the external device 30 may transmit the data of the second user to the electronic device 100, and the electronic device 100 may receive the data of the second user from the external device 30.

Figure 10:
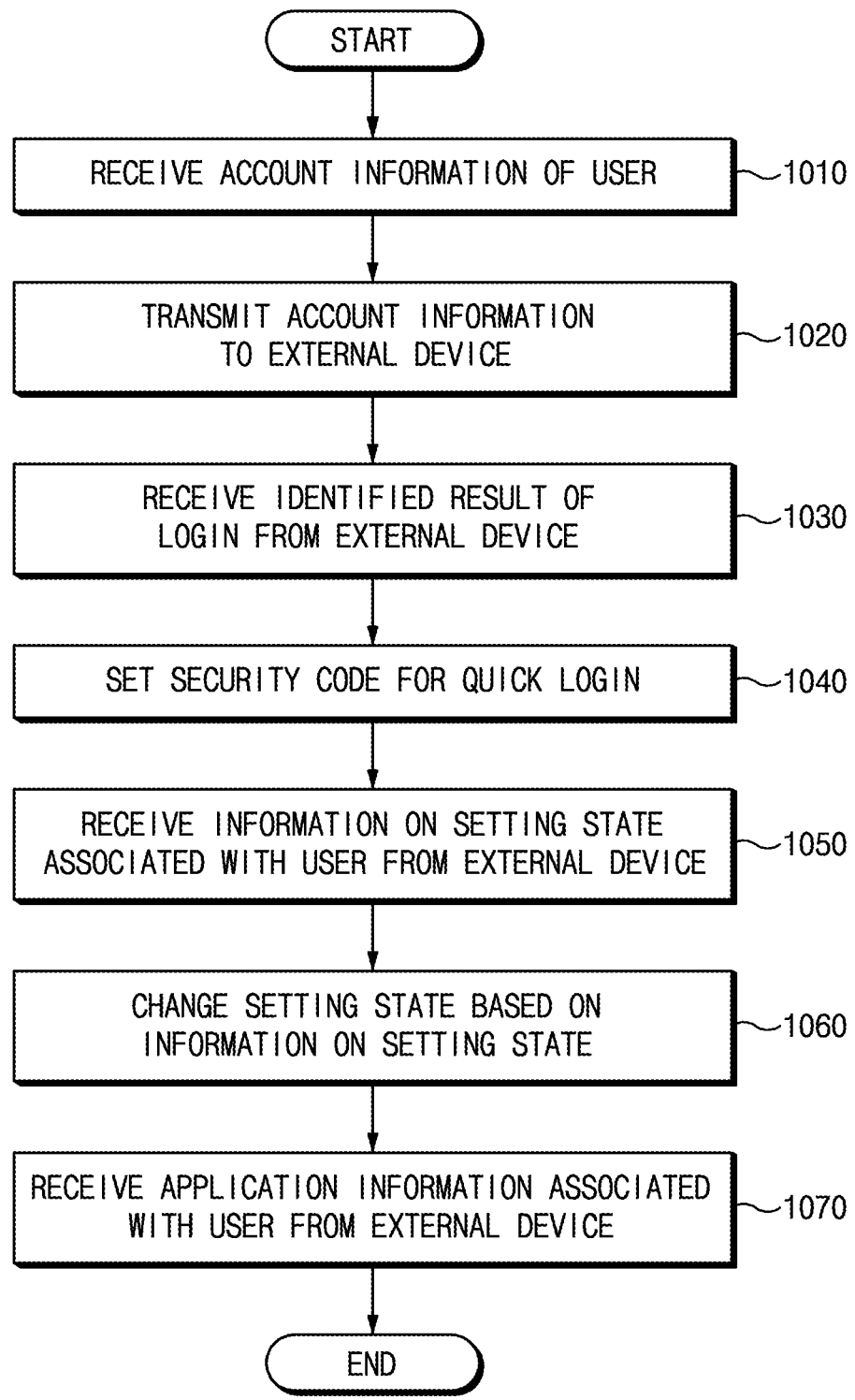
FIG. 10 is a flowchart illustrating a method for commonly using an electronic device according to various embodiments of the present disclosure.

FIG. 10 is a flowchart illustrating a method for commonly using an electronic device according to various embodiments of the present disclosure.

The flowchart shown in FIG. 10 may be configured to include operations processed by the electronic device 100 shown in FIG. 1 or the electronic device 100 shown in FIG. 2. Accordingly, even though descriptions are omitted below, descriptions associated with the electronic device 100 shown in FIG. 1 or the electronic device 100 shown in FIG. 2 may be applied to the flowchart shown in FIG. 10.

Referring to FIG. 10, the electronic device 100 (e.g., the account managing module 142) may receive the account information from the user in operation 1010. For example, the electronic device 100 may receive the account information including the ID and the password from the user through the login interface.

According to an embodiment of the present disclosure, the operation of receiving the account information may identify biometric information of the user and receive the account information according to the identified result in addition to the ID or the password. The biometric information of the user may include, for example, various information, such as fingerprint information, iris information, or the like, which are used to identify the user.

When the account information are received, the electronic device 100 (e.g., the account managing module 142) may transmit the account information to the external device 30 in operation 1020. According to an embodiment of the present disclosure, the electronic device 100 may request the identification of the user to the external device 30 while transmitting the account information.

When the account information are transmitted, the electronic device 100 (e.g., the account managing module 142) may receive the identified result from the external device 30 in operation 1030. For example, in a case that the account information provided from the electronic device 100 are consistent with the account information stored in the external device 30, the external device 30 may identify the login and transmit the identified result to the electronic device 100. According to an embodiment of the present disclosure, the electronic device 100 may receive the token with the identified result. The electronic device 100 may identify the user using the received token and automatically log in to the email account of the user requesting to log in.

When the identified result is received, the electronic device 100 (e.g., the account managing module 142) may set the security code for the quick login in operation 1040. For example, the electronic device 100 may receive the code from the user through the security code setting interface and set the code to the security code. In an embodiment of the present disclosure, when the security code is set, the electronic device 100 may transmit the security code to the secure memory arranged inside or outside the electronic device 100, and the security code may be stored in the secure memory.

With reference to FIG. 10, the above-mentioned operation 1040 may be set to be omitted, or may be omitted by a user's selection.

When the security code is set, the electronic device 100 (e.g., the account switching module 143) may receive the setting information of the user requesting to log in from the external device 30 in operation 1050. For example, the external device 30 may receive the ID information of the user requesting to log in from the electronic device 100 and transmit the setting information corresponding to the received ID information to the electronic device 100.

In an embodiment of the present disclosure, the electronic device 100 may receive the personal information, such as the picture, the name, the belonging group, the position, or the like, of the user requesting to log in from the external device 30. When the personal information are received, the electronic device 100 may receive setting information on the belonging group. The setting information on the belonging group may be differently set in accordance with the group to which the user belongs. For example, in a case that an arbitrary user among a plurality of users belonging to "A" group logs in, the electronic device 100 may receive setting information on the "A" group from the external device 30.

When the setting information are received, the electronic device 100 (e.g., the account switching module 143) may change the setting state of the electronic device 100 based on the setting information in operation 1060. For example, the electronic device 100 may execute instructions included in the setting information to change the setting state of the electronic device 100. As another example, the electronic device 100 may receive an application recorded in the setting information from the external device 30 and install the application.

When the setting state is changed, the electronic device 100 (e.g., the account switching module 143) may receive the application information associated with the user requesting to log in from the external device 30 in operation 1070. According to an embodiment of the present disclosure, the application information may be included in the setting information. For example, the external device 30 may receive the ID information on the user requesting to log in from the electronic device 100 and may transmit the application corresponding to the received ID information to the electronic device 100. The application information may include, for example, the application identifier or the application package. The electronic device 100 may receive the application package corresponding to the application identifier from the external device 30 based on the application identifier. The electronic device 100 may install the application on the electronic device 100 using the application package.

Although not shown in FIG. 10, when the user logs in, the electronic device 100 (e.g., the control module 141) may display the personal information of the user through the personal information display interface.

As described above, the setting information and the data may be received according to the user login, the electronic device 100 commonly used by the users may provide different environment settings for each user.

Figure 11:
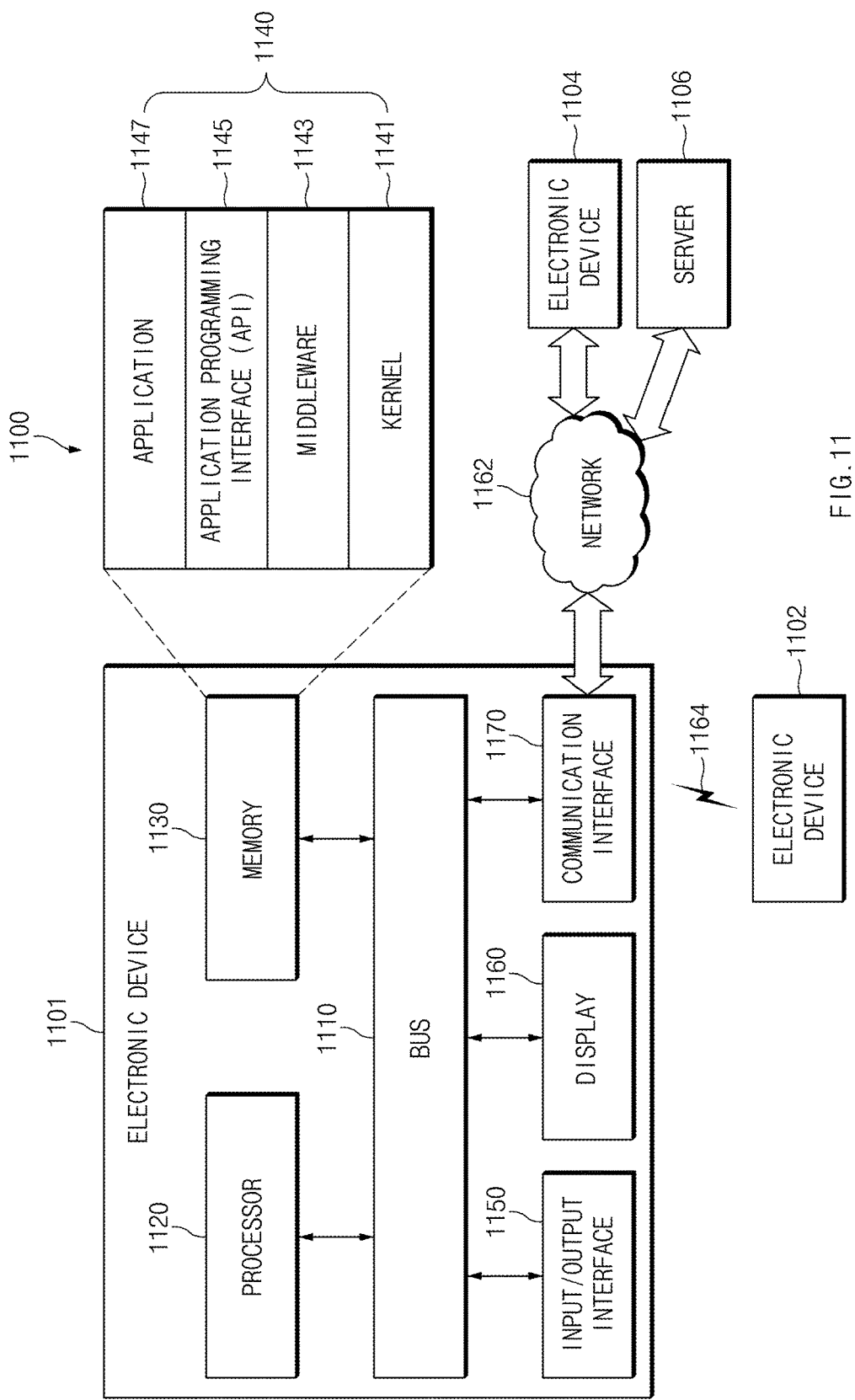
FIG. 11 is a block diagram illustrating an electronic device according to various embodiments of the present disclosure.

FIG. 11 is a block diagram illustrating an electronic device in a network environment according to various embodiments of the present disclosure.

Hereinafter, an electronic device 1101 in a network environment 1100 according to various embodiments will be described in detail with reference to FIG. 11. The electronic device 1101 may include a bus 1110, a processor 1120, a memory 1130, an input/output (I/O) interface 1150, a display 1160, and a communication interface 1170. According to an embodiment of the present disclosure, the electronic device 1101 may not include at least one of the above-described components or may further include one or more other components (not shown).

The bus 1110 may interconnect the above-described components 1110 to 1170 and may be a circuit for conveying communications (e.g., a control message and/or data) among the above-described components.

The processor 1120 may include one or more of a central processing unit (CPU), an application processor (AP), or a communication processor (CP). The processor 1120 may perform, for example, data processing or an operation associated with control or communication of at least one other component(s) of the electronic device 1101.

The memory 1130 may include a volatile and/or nonvolatile memory. The memory 1130 may store instructions or data associated with at least one other component(s) of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application (or an application program) 1147. At least a portion of the kernel 1141, the middleware 1143, or the API 1145 may be called an "operating system (OS)".

The kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete components of the electronic device 1101 so as to control or manage system resources.

The middleware 1143 may perform a mediation role such that the API 1145 or the application program 1147 communicates with the kernel 1141 to exchange data.

Furthermore, the middleware 1143 may process task requests received from the application program 1147 according to a priority. For example, the middleware 1143 may assign the priority, which makes it possible to use a system resource (e.g., the bus 1110, the processor 1120, the memory 1130, or the like) of the electronic device 1101, to at least one of the application program 1147. For example, the middleware 1143 may process the one or more task requests according to the priority assigned to the at least one, which makes it possible to perform scheduling or load balancing on the one or more task requests.

The API 1145, shown in FIG. 11, may be an interface through which the application program 1147 controls a function provided by the kernel 1141 or the middleware 1143, and may include, for example, at least one interface or function (e.g., an instruction) for a file control, a window control, image processing, a character control, or the like.

The I/O interface 1150 may transmit an instruction or data, input from a user or another external device, to other component(s) of the electronic device 1101. Furthermore, the I/O interface 1150 may output an instruction or data, received from other component(s) of the electronic device 1101, to a user or another external device.

The display 1160 may include, for example, a liquid crystal display (LCD), a light-emitting diode (LED) display, an organic LED (OLED) display, or a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a portion of a user's body.

The communication interface 1170 may establish communication between the electronic device 1101 and an external electronic device (e.g., a first external electronic device 1102, a second external electronic device 1104, or a server 1106). For example, the communication interface 1170 may be connected to a network 1162 through wireless communication or wired communication to communicate with the external device (e.g., a second external electronic device 1104 or a server 1106).

The wireless communication may include at least one of, for example, a long-term evolution (LTE), an LTE-advanced (LTE-A), a code division multiple access (CDMA), a wideband CDMA (WCDMA), a universal mobile telecommunications system (UMTs), a wireless broadband (WiBro), a global system for mobile communications (GSM), or the like, as cellular communication protocol. Furthermore, the wireless communication may include, for example, a local area network 1164. The local area network 1164 may include, for example, at least one of a wireless fidelity (Wi-Fi), a Bluetooth, a near field communication (NFC), or global navigation satellite systems (GNSS). The GNSS may include at least one of, for example, global positioning system (GPS), global navigation satellite system (Glonass), Beidou navigation satellite system (Beidou), or the European global satellite-based system (Galileo). Hereinafter, GPS and GNSS may be interchangeably used in the following descriptions. The wired communication may include at least one of, for example, a universal serial bus (USB), a high definition multimedia interface (HDMI), a recommended standard-132 (RS-132), or a plain old telephone service (POTS). The network 1162 may include at least one of telecommunications networks, for example, a computer network (e.g., local area network (LAN) or wide area network (WAN)), an internet, or a telephone network.

Each of the first external electronic device 1102 and the second external electronic device 1104 may be a device of which the type is different from or the same as that of the electronic device 1101. According to an embodiment of the present disclosure, the server 1106 may include a group of one or more servers. According to various embodiments, all or a part of operations that the electronic device 1101 will perform may be executed by another or plural electronic devices (e.g., the electronic devices 1102 and 1104 and the server 1106). According to an embodiment of the present disclosure, in the case where the electronic device 1101 executes any function or service automatically or in response to a request, the electronic device 1101 may not perform the function or the service internally, but, alternatively additionally, it may request at least a portion of a function associated with the electronic device 1101 at another device (e.g., the electronic device 1102 or 1104 or the server 106). The other electronic device (e.g., the electronic device 1102 or 1104 or the server 1106) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
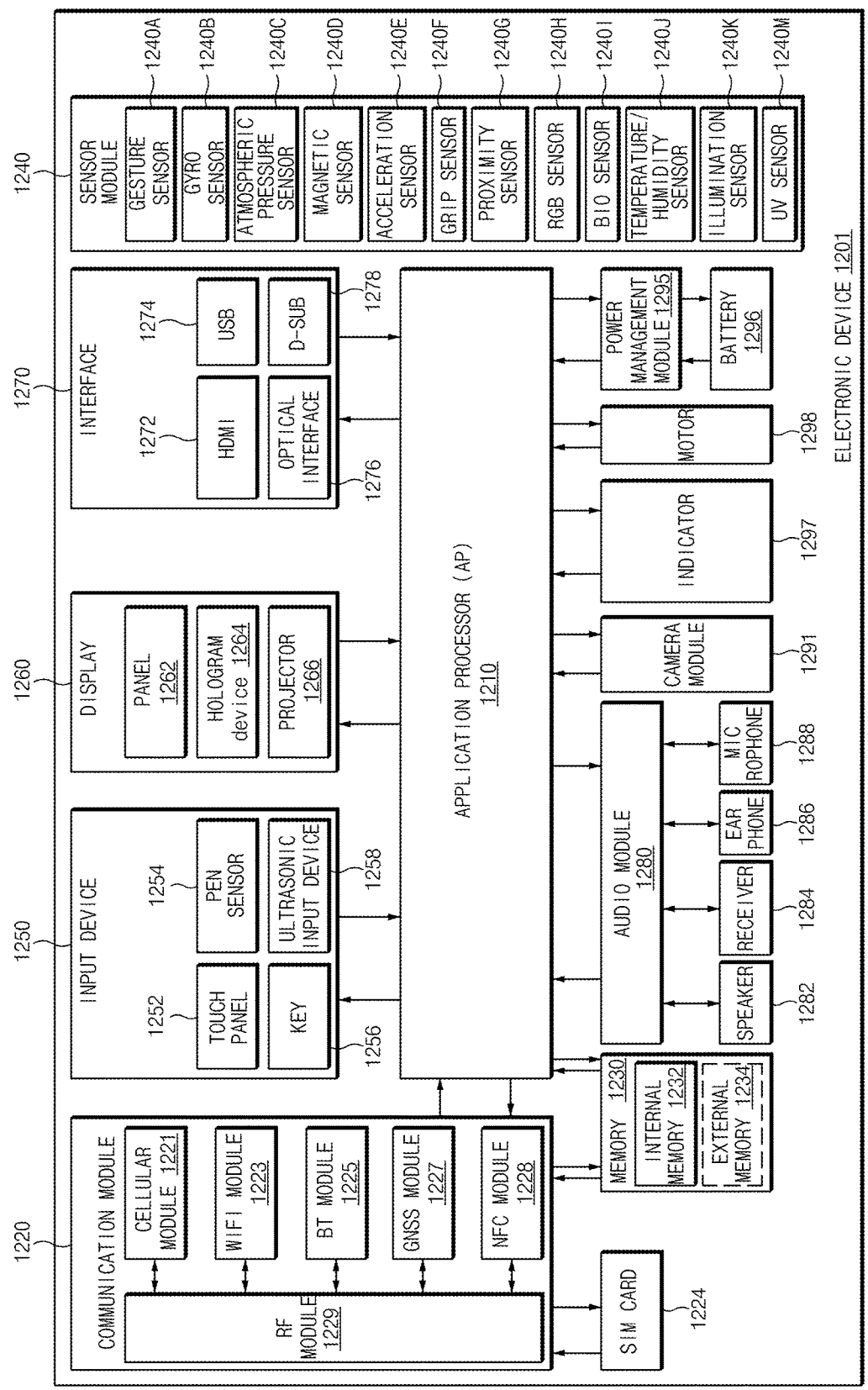
FIG. 12 is a block diagram illustrating an electronic device according to various embodiments of the present disclosure.

FIG. 12 is a block diagram illustrating an electronic device according to various embodiments of the present disclosure.

Referring to FIG. 12, an electronic device 1201 may include, for example, all or a part of an electronic device illustrated in the above-mentioned various embodiments. The electronic device 1201 may include at least one processor (e.g., an application processor (AP)) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive an operating system (OS) or an application program to control a plurality of hardware or software components connected to the processor 1210 and may process and compute a variety of data. The processor 1210 may be implemented with a System on Chip (SoC), for example. According to an embodiment of the present disclosure, the processor 1210 may further include a graphic processing unit (GPU) and/or an image signal processor. The processor 1210 may include at least a part (e.g., a cellular module 1221) of components illustrated in FIG. 12. The processor 1210 may load and process an instruction or data, which is received from at least one of other components (e.g., a nonvolatile memory), and may store a variety of data at a nonvolatile memory.

The communication module 1220 may be configured in the same manner as or similar to the communication interface 1170 of FIG. 11. The communication module 1220 may include a cellular module 1221, a Wi-Fi module 1223, a BT module 1225, a GNSS module (e.g., a GPS module 1227, a Glonass module, a Beidou module, a Galileo module, etc.), a NFC module 1228, and a radio frequency (RF) module 1229.

The cellular module 1221 may provide voice communication, video communication, a text service, an Internet service or the like through a communication network. According to an embodiment of the present disclosure, the cellular module 1221 may perform discrimination and authentication of the electronic device 1201 within a communication network using a subscriber identification module 1224 (e.g., a subscriber identity module (SIM) card), for example. According to an embodiment of the present disclosure, the cellular module 1221 may perform at least a portion of functions that the processor 1210 provides. According to an embodiment of the present disclosure, the cellular module 1221 may include a communication processor (CP).

Each of the Wi-Fi module 1223, the BT module 1225, the GNSS module 1227, and the NFC module 1228 may include a processor for processing data exchanged through a corresponding module, for example. According to an embodiment of the present disclosure, at least a portion (e.g., two or more components) of the cellular module 1221, the Wi-Fi module 1223, the BT module 1225, the GNSS module 1227, and the NFC module 1228 may be included within one integrated circuit (IC) or an IC package.

The RF module 1229 may transmit and receive a communication signal (e.g., an RF signal). The RF module 1229 may include a transceiver, a power amplifier module (PAM), a frequency filter, a low noise amplifier (LNA), an antenna, or the like. According to another embodiment of the present disclosure, at least one of the cellular module 1221, the Wi-Fi module 1223, the BT module 1225, the GNSS module 1227, or the NFC module 1228 may transmit and receive an RF signal through a separate RF module.

The subscriber identification module 1224 may include, for example, a card and/or embedded SIM including a subscriber identification module and may include unique identify information (e.g., integrated circuit card identifier (ICCID)) or subscriber information (e.g., integrated mobile subscriber identity (IMSI)).

The memory 1230 (e.g., a memory 130) may include an internal memory 1232 or an external memory 1234. For example, the internal memory 1232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory (e.g., a NAND flash memory or a NOR flash memory), a hard drive, or a solid state drive (SSD).

The external memory 1234 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 1234 may be functionally and/or physically connected to the electronic device 1201 through various interfaces.

With reference to FIG. 12, the sensor module 1240 may measure, for example, a physical quantity or may detect an operation state of the electronic device 1201. The sensor module 1240 may convert the measured or detected information to an electric signal. The sensor module 1240 may include at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric (BIO) sensor 1240I, a temperature/humidity sensor 1240J, an illuminance or illumination sensor 1240K, or an ultraviolet (UV) sensor 1240M. Although not illustrated, additionally or alternatively, the sensor module 1240 may further include, for example, an electronic nose (E-nose) sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment of the present disclosure, the electronic device 1201 may further include a processor which is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a digital stylus or (digital) pen sensor 1254, a key 1256, or an ultrasonic input unit 1258. The touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The digital stylus or (digital) pen sensor 1254 may be, for example, a part of a touch panel or may include an additional sheet for recognition. The key 1256 may include, for example, a physical button, an optical key, a keypad, and the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., a display 1160) may include a panel 1262, a hologram device 1264, or a projector 1266. The panel 1262 may be configured the same as or similar to the display 1160 of FIG. 11. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be arranged in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI (high-definition multimedia interface) 1272, a USB (universal serial bus) 1274, an optical interface 1276, or a D-sub-miniature (D-sub) 1278. The interface 1270 may be included, for example, in a communication interface 1170 illustrated in FIG. 11. Additionally or alternatively, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a portion of the audio module 1280 may be included, for example, in an input/output interface 1150 illustrated in FIG. 11. The audio module 1280 may process, for example, sound information that is input or output through a speaker 1282, a receiver 1284, an earphone 1286, or a microphone (MIC) 1288.

The camera module 1291 for shooting a still image or a video may include, for example, at least one image sensor (e.g., a front sensor or a rear sensor), a lens, an image signal processor (ISP), or a flash (e.g., an LED or a xenon lamp).

With reference to FIG. 12, the power management module 1295 may manage, for example, power of the electronic device 1201. According to an embodiment of the present disclosure, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery or a solar battery.

The indicator 1297 may display a specific state of the electronic device 1201 or a portion thereof (e.g., a processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 2601. The processing device for supporting a mobile TV may process media data according to the standards of DMB, digital video broadcasting (DVB), MediaFlo™, or the like.

Each of the above-mentioned elements of the electronic device described in the present disclosure may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 13:
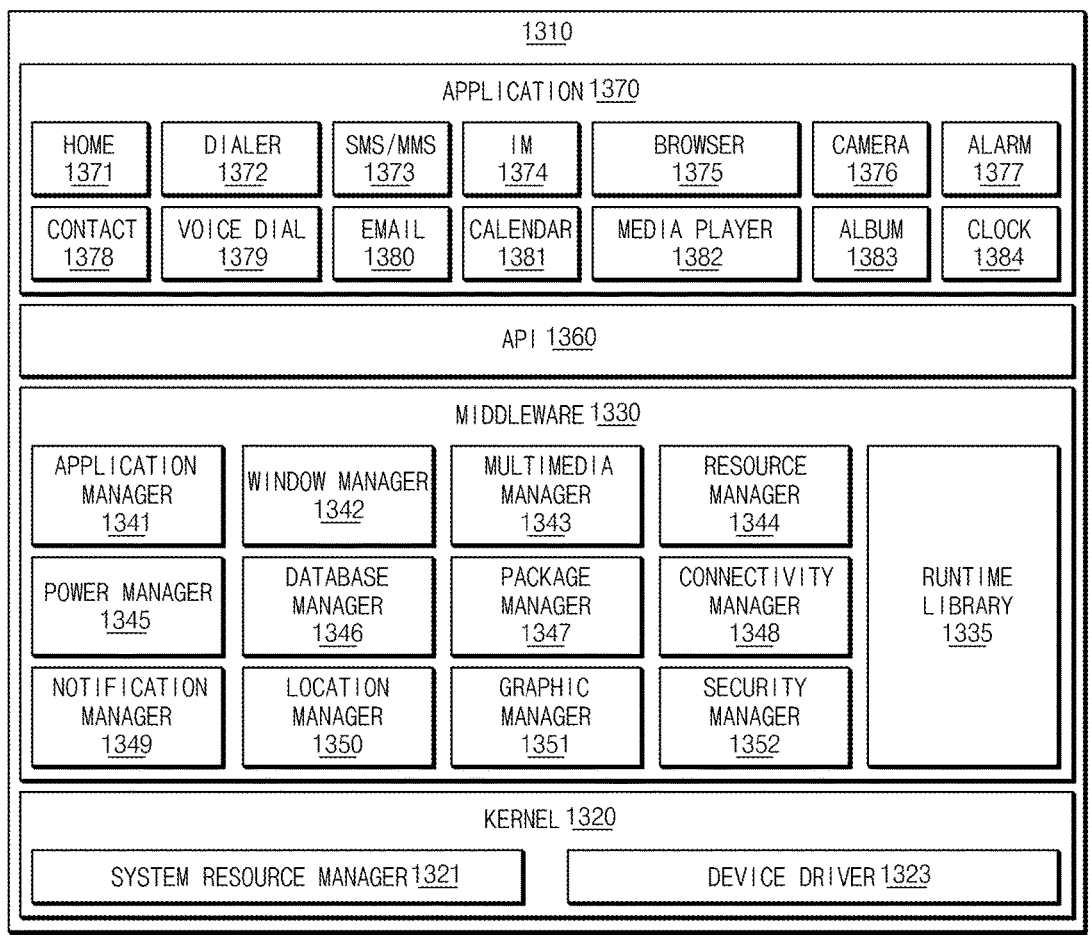
FIG. 13 is a block diagram illustrating a program module according to various embodiments of the present disclosure.

FIG. 13 is a block diagram illustrating a program module according to various embodiments of the present disclosure.

Referring to FIG. 13, according to an embodiment of the present disclosure, a program module 1310 (e.g., a program 1140) may include an operating system (OS) to control resources associated with an electronic device (e.g., an electronic device 1101) and/or diverse applications (e.g., an application program 1147) driven on the OS. The OS may be, for example, Android®, iOS®, Windows®, Symbian®, Tizen®, or Bada®.

The program module 1310 may include a kernel 1320, a middleware 1330, an application programming interface (API) 1360, and/or an application 1370. At least a part of the program module 1310 may be preloaded on an electronic device or may be downloadable from an external electronic device (e.g., electronic devices 1102 and 1104, a server 1106).

The kernel 1320 (e.g., a kernel 1141) may include, for example, a system resource manager 1321 and/or a device driver 1323. The system resource manager 1321 may perform control, allocation, or retrieval of system resources. According to an embodiment of the present disclosure, the system resource manager 1321 may include a process managing part, a memory managing part, or a file system managing part. The device driver 1323 may include, for example, a display driver, a camera driver, a BT driver, a common memory driver, an USB driver, a keypad driver, a Wi-Fi driver, an audio driver, or an inter-process communication (IPC) driver.

The middleware 1330 may provide, for example, a function which the application 1370 needs in common, or may provide diverse functions to the application 1370 through the API 1360 to allow the application 1370 to efficiently use limited system resources of the electronic device. According to an embodiment of the present disclosure, the middleware 1330 (e.g., a middle 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

The runtime library 1335 may include, for example, a library module which is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a GUI resource which is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database which is to be used in at least one application of the application 1370. The package manager 1347 may install or update an application which is distributed in the form of package file.

The connectivity manager 1348 may manage, for example, wireless connection such as Wi-Fi or BT. The notification manager 1349 may display or notify an event such as arrival message, promise, or proximity notification in a mode that does not disturb a user. The location manager 1350 may manage location information of an electronic device. The graphic manager 1351 may manage a graphic effect that is provided to a user, or manage a user interface relevant thereto. The security manager 1352 may provide a general security function necessary for system security or user authentication. According to an embodiment of the present disclosure, in the case where an electronic device (e.g., an electronic device 1101) includes a telephony function, the middleware 1330 may further include a telephony manager for managing a voice or video call function of the electronic device.

The middleware 1330 may include a middleware module that combines diverse functions of the above-described components. The middleware 1330 may provide a module specialized to each OS kind to provide differentiated functions. Additionally, the middleware 1330 may remove a part of the preexisting components, dynamically, or may add a new component thereto.

The API 1360 (e.g., an API 1145) may be, for example, a set of programming functions and may be provided with a configuration which is variable depending on an OS. For example, in the case where an OS is the android or the iOS, it may be permissible to provide one API set per platform. In the case where an OS is Tizen®, it may be permissible to provide two or more API sets per platform.

With reference to FIG. 13, the application 1370 (e.g., an application program 1147) may include, for example, one or more applications capable of providing functions for a home 1371, a dialer 1372, an short message service (SMS)/multimedia message service (MMS) 1373, an instant message (IM) 1374, a browser 1375, a camera 1376, an alarm 1377, a contact 1378, a voice dial 1379, an e-mail 1380, a calendar 1381, a media player 1382, an album 1383, and a timepiece or clock 1384, or for providing other functions (not shown) related to health care (e.g., measuring an exercise quantity or blood sugar) or environment information (e.g., atmospheric pressure, humidity, or temperature).

According to an embodiment of the present disclosure, the application 1370 may include an application (hereinafter referred to as "information exchanging application" for descriptive convenience) to support information exchange between the electronic device (e.g., an electronic device 1101) and the external electronic device (e.g., external devices 1102 and 1104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., electronic devices 102 and 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., electronic devices 1102 and 1104), which communicates with the electronic device, an application running in the external electronic device, or a service (e.g., a call service or a message service) provided from the external electronic device.

According to an embodiment of the present disclosure, the application 1370 may include an application (e.g., a health care application of mobile medical devices) which is assigned in accordance with an attribute of the external electronic device (e.g., electronic devices 1102 and 1104). According to an embodiment of the present disclosure, the application 1370 may include an application which is received from the external electronic device (e.g., the server 1106 or the external electronic devices 1102 and 1104). According to an embodiment of the present disclosure, the application 1370 may include a preloaded application or a third party application which is downloadable from a server. The component titles of the program module 1310 according to the embodiment of the present disclosure may be modifiable depending on kinds of OSs.

According to various embodiments, at least a portion of the program module 1310 may be implemented by software, firmware, hardware, or a combination of two or more thereof. At least a portion of the program module 1310 may be implemented (e.g., executed), for example, by a processor (e.g., a processor 120). At least a portion of the program module 1310 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments, at least a portion of an apparatus (e.g., modules or functions thereof) or a method (e.g., operations) according to various embodiments of the present disclosure, for example, may be implemented by instructions stored in a computer-readable storage media in the form of a programmable module. In the case that the instructions are executed by the processor (e.g., the processor 120), the one or more processors may execute a function corresponding to the instructions. The computer-readable storage media may be, but not limited to, the memory 130.

A computer-readable recording media may include a hard disk, a floppy disk, a magnetic media (e.g., a magnetic tape), an optical media (e.g., CD-ROM, and a DVD), a magneto-optical media (e.g., a floptical disk), and a hardware device (e.g., ROM, RAM, a flash memory, or the like). Also, a program instruction may include not only a mechanical code such as items generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to various embodiments of the present disclosure, unauthorized users may be blocked from gaining access to the electronic device, and thus security of the electronic device may be improved. In addition, since different states and data are provided depending on the users, usability of the commonly used electronic device may be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a housing;
    a memory disposed in the housing;
    a secure memory disposed in the housing;
    a communication circuit in communication with at least one external device; and
    a processor electrically connected to the memory, the secure memory, and the communication circuit,
    wherein the processor is configured to control for:
        performing a user login to the at least one external device using a user identification and a password,
        in response to the user login to the at least one external device, setting a security code for a quick login in the secure memory according to a user input,
        in response to the user login, installing at least one application on the memory,
        unlocking the electronic device when the security code is received in a locked state of the electronic device,
        receiving a logout request from a user after the at least one application is installed,
        in response to the logout request, transmitting data associated with the at least one application to the at least one external device using the communication circuit, and
        deleting at least a portion of the at least one application, the security code, and the data associated with the at least one application from the memory.

2. The electronic device of claim 1, wherein the processor is further configured to control for:
    receiving the data associated with the at least one application from the at least one external device in response to the user login to the at least one external device, and
    storing at least a portion of the data associated with the at least one application.

3. The electronic device of claim 1, wherein the data associated with the at least one application comprises data generated or changed by the user while the user logs into the electronic device.

4. The electronic device of claim 1, wherein the processor is further configured to control for:
    receiving setting information associated with the user from the at least one external device in response to the login request and changing a setting state of the electronic device based on at least a portion of the setting information.

5. The electronic device of claim 4, wherein the processor is further configured to control for installing the at least one application on the memory based on the portion of the setting information.

6. The electronic device of claim 1, wherein, when the transmission of the data associated with the at least one application is completed, the processor is further configured to control for initializing a setting state of the electronic device based on initial setting information provided from the at least one external device or initial setting information previously stored in the memory.

7. The electronic device of claim 1, further comprising:
a display electrically connected to the processor,
wherein the processor is further configured to control for displaying a login interface receiving account information on the user or another user using the display when the user logs out.

8. The electronic device of claim 4, wherein the setting information is differently set in accordance with a user group to which the user belongs.

9. A method of commonly using an electronic device, the method comprising:
performing a user login to an at least one external device using a user identification and a password;
in response to the user login to the at least one external device, setting a security code for a quick login, which allows a user to unlock the electronic device with the security code in a locked state, in a secure memory of the electronic device according to a user input;
in response to the user login, installing at least one application in a memory of the electronic device;
receiving a logout request from the user after the at least one application is installed;
in response to the logout request, transmitting data associated with the at least one application to the at least one external device; and
deleting at least a portion of the at least one application, the security code, and the data associated with the at least one application.

10. The method of claim 9, further comprising:
receiving the data associated with the at least one application from the at least one external device in response to the login request; and
storing at least a portion of the data associated with the at least one application.

11. The method of claim 9, further comprising:
receiving setting information associated with the user from the at least one external device in response to the login request; and
changing a setting state of the electronic device based on at least a portion of the setting information.

12. The method of claim 11, wherein the installing of the at least one application comprises installing the at least one application based on the portion of the setting information.

13. The method of claim 9, further comprising, when the transmission of the data associated with the at least one application is completed, initializing a setting state of the electronic device based on initial setting information provided from the at least one external device or initial setting information previously stored.

14. The method of claim 9, further comprising displaying a login interface to receive account information on the user or another user when the user logs out.

15. The method of claim 9, further comprising:
receiving account information of the user, and
transmitting the account information to the external device.

* * * * *